United States Patent
Herranen

(10) Patent No.: US 12,054,939 B2
(45) Date of Patent: Aug. 6, 2024

(54) METHOD FOR MANUFACTURING BUILDING ELEMENT WITH WOODEN FRAME, BUILDING ELEMENT WITH WOODEN FRAME, AND BUILDING ELEMENT SYSTEM

(71) Applicant: Vacuum Insulation Solutions Oy, Helsinki (FI)

(72) Inventor: Pasi Herranen, Helsinki (FI)

(73) Assignee: AALTO UNIVERSITY FOUNDATION SR, Helsinki (FI)

( * ) Notice: Subject to any disclaimer, the term of this patent is extended or adjusted under 35 U.S.C. 154(b) by 644 days.

(21) Appl. No.: 17/275,990

(22) PCT Filed: Sep. 18, 2019

(86) PCT No.: PCT/FI2019/050666
§ 371 (c)(1),
(2) Date: Mar. 12, 2021

(87) PCT Pub. No.: WO2020/058575
PCT Pub. Date: Mar. 26, 2020

(65) Prior Publication Data
US 2021/0277652 A1     Sep. 9, 2021

(30) Foreign Application Priority Data

Sep. 19, 2018   (FI) ..................... 20185776

(51) Int. Cl.
*E04B 1/80*   (2006.01)
*B32B 3/04*   (2006.01)
(Continued)

(52) U.S. Cl.
CPC ............ *E04B 1/803* (2013.01); *B32B 3/04* (2013.01); *B32B 5/16* (2013.01); *B32B 15/16* (2013.01);
(Continued)

(58) Field of Classification Search
CPC . E04B 1/803; E04C 2/12; E04C 2/284; E04C 2/36; E04C 2/38; E04C 2/08; E04C 2002/3488
See application file for complete search history.

(56) References Cited

U.S. PATENT DOCUMENTS

| 3,150,793 A | 9/1964 | Messer |
| 3,968,831 A | 7/1976 | Xenophou |

(Continued)

FOREIGN PATENT DOCUMENTS

| CN | 2232467 Y | 8/1996 |
| CN | 101929205 A | 12/2010 |

(Continued)

OTHER PUBLICATIONS

Search Report, China Patent Application No. 2019800612704, mailed Feb. 27, 2022 (6 pages).

(Continued)

*Primary Examiner* — Rodney Mintz
(74) *Attorney, Agent, or Firm* — Thomas } Horstemeyer, LLP

(57) ABSTRACT

A method for manufacturing a building element with a wooden frame, the method comprising forming the frame of the element of wooden panels filling the space inside the frame with insulation material, coating the wooden panels which define the outer surfaces of the frame of the building element to be substantially air-tight, filling the space inside the frame with expanded perlite, and applying vacuum in the space inside the building element by a vacuum pump connected to the element. The invention also relates to such a building element with a wooden frame, as well as a building element system consisting of a plurality of such building elements with a wooden frame.

9 Claims, 7 Drawing Sheets

(51) Int. Cl.
*B32B 5/16* (2006.01)
*B32B 15/16* (2006.01)
*B32B 17/06* (2006.01)
*B32B 25/04* (2006.01)
*E04C 2/08* (2006.01)
*E04C 2/12* (2006.01)
*E04C 2/284* (2006.01)
*E04C 2/34* (2006.01)
*E04C 2/36* (2006.01)
*E04C 2/38* (2006.01)
*F16L 59/065* (2006.01)

(52) U.S. Cl.
CPC .......... *B32B 17/068* (2013.01); *B32B 25/047* (2013.01); *E04C 2/12* (2013.01); *E04C 2/284* (2013.01); *E04C 2/36* (2013.01); *E04C 2/38* (2013.01); *F16L 59/065* (2013.01); *B32B 2264/101* (2013.01); *B32B 2307/304* (2013.01); *B32B 2419/00* (2013.01); *E04C 2/08* (2013.01); *E04C 2002/3488* (2013.01)

(56) References Cited

U.S. PATENT DOCUMENTS

| | | | | |
|---|---|---|---|---|
| 4,745,015 | A * | 5/1988 | Cheng | E04B 1/803 428/920 |
| 5,168,674 | A * | 12/1992 | Molthen | E04B 1/803 52/592.1 |
| 5,330,816 | A * | 7/1994 | Rusek, Jr. | C03B 37/15 428/69 |
| 6,106,655 | A * | 8/2000 | Moser | B27M 3/0086 156/87 |
| 9,771,714 | B2 * | 9/2017 | Castelle | E04B 1/7612 |
| 10,012,348 | B2 * | 7/2018 | Ray | C04B 30/02 |
| 11,891,798 | B1 * | 2/2024 | Dimanshteyn | E04B 1/86 |
| 2016/0186427 | A1 * | 6/2016 | Castelle | E04C 2/02 52/510 |
| 2017/0227165 | A1 * | 8/2017 | Ray | E04C 2/049 |

FOREIGN PATENT DOCUMENTS

| | | |
|---|---|---|
| CN | 102121284 A | 7/2011 |
| CN | 104329558 A | 2/2015 |
| CN | 204163204 U | 2/2015 |
| CN | 204978378 U | 1/2016 |
| JP | S49-078331 A | 11/1972 |
| JP | S54038175 U | 3/1979 |
| JP | H05302371 A | 11/1993 |
| JP | 2007218055 A | 8/2007 |
| JP | 2009162038 B2 | 7/2009 |
| WO | 02103127 A1 | 12/2002 |

OTHER PUBLICATIONS

ISR Mailed Jun. 27, 2023; Japanese Patent Application No. 2021-514973.

* cited by examiner

METHOD FOR MANUFACTURING BUILDING ELEMENT WITH WOODEN FRAME, BUILDING ELEMENT WITH WOODEN FRAME, AND BUILDING ELEMENT SYSTEM

PRIORITY

This application is a U.S. national application of the international application number PCT/FI2019/050666 filed on Sep. 18, 2019 and claiming priority of FI application number 20185776 filed on Sep. 19, 2018, the contents of all of which are incorporated herein by reference.

FIELD OF THE INVENTION

This invention relates to a prefabricated building element with a wooden frame, and a method for manufacturing the same. More precisely, the invention relates to a building element made of a wood material and having a box-shaped frame structure, insulating material being provided inside the box-shaped frame structure; a method for manufacturing such a building element; as well as a building element system comprising a plurality of such building elements.

TECHNICAL BACKGROUND

Various building elements are known from prior art. The building elements are typically prefabricated elements of a building which are delivered from the manufacturing plant to the building site for installation. The building elements typically comprise a supporting material layer or framework of which may be made of, for example, concrete or wood, as well as an insulation material layer provided on or in the supporting material.

A type of insulation for buildings is vacuum insulated panels (VIP), in which insulation material is provided inside a gas-tight box-like structure, and a vacuum is applied in the box-like structure of the insulated panel at the production stage. This vacuum substantially improves the thermal insulation capacity of the insulation panel.

Vacuum insulation system technology is applied in structures of buildings as well.

Document U.S. Pat. No. 3,968,831 discloses a solution, in which heat transfer in a wall structure of a building is controlled by applying a vacuum between the panels of the wall structure and by adjusting the vacuum for controlling heat transfer in the wall structure.

In applying the vacuum technology to more complex structures, it has been problematic to develop a polygonal element frame which bears the load caused by the air pressure difference and, as such, has a sufficiently low heat transfer capacity.

BRIEF DESCRIPTION OF THE INVENTION

The present invention provides a building element with a wooden frame, the wooden frame of the element being provided with an air-tight coating, the frame being filled with expanded perlite, and a vacuum being applied in the element by a vacuum pump. The vacuum pump may be an integral part of the element, or it may be a component attached to the element.

The building element with wooden frame according to the invention withstands an underpressure close to zero bar, and in practice, it eliminates the problem of the dew point in buildings, because the vacuum pump can be used to remove internal moisture in gaseous form out of the element. The building element according to the invention provides the structure with very efficient thermal insulation, a dry and mold-free structural design, as well as a dynamically adjustable thermal transmittance coefficient. By changing the internal pressure in the element by a vacuum pump, it is possible to change the amount of thermal energy transferred through the element.

The thermal conductivity of the expanded perlite layer is formed by the sum of: 1) the thermal conductivity of air (within the porous perlite layer), 2) the thermal conductivity of solids, and 3) the heat transfer caused by thermal radiation. In the microsized porous structure, a radical decrease in the thermal conductivity of air is achieved even at a considerably higher pressure than in a large empty space. Air transfers heat by collisions of air molecules. With a sufficient decrease in pressure, air molecules will collide with the walls of the porous filling material more often than with each other, resulting in a decrease in the thermal conductivity of air. In the case of expanded perlite, the thermal conductivity of air can be reduced to a level close to zero already at a pressure of about 0.1 millibar. If no filling material is used, a pressure up to 1000 times lower should be achieved (the order is dependent on the thickness of the insulation layer). No compressive stress should be applied to the expanded perlite itself, or else the porous structure of the perlite particle will collapse, and the solid mineral material will conduct a several times greater amount of heat through it.

Preferably, the building element according to the invention can also be used under conditions where a high moisture content together with a high temperature pose great problems for element designs of prior art. For example, in the case of polyurethane and polystyrene, hydrolysis ruptures bonds between molecules, finally breaking down the whole insulation layer. In the case of mineral wools, the binding agent of the wools begins to degrade over time. Furthermore, possible condensation of air moisture in the wool layer will radically impair the thermal insulation capacity. On the other hand, vacuum insulated panels (VIP), which are already on the market, would be functional with respect to their properties, but in their case cost efficiency constitutes constraints on the use of the technology in a number of potential applications. In the manufacture of vacuum insulation system (VIS) elements according to the invention, it is possible to use inexpensive raw materials, which is why they also provide a cost efficient alternative.

In the method for manufacturing a building element with a wooden frame according to the invention, an element frame is formed of wooden panels, the space inside the frame is filled with insulation material, the wooden panels defining the outer surfaces of the frame of the building element are coated to be substantially air tight, the space inside the frame is filled with expanded perlite, and a suction is applied in the space inside the building element by a vacuum pump connected to the element.

In an embodiment of the method according to the invention, the edges of the panels of the building element are preferably provided with bevels, at which the panels are joined together by a glued joint. In this way, a joint is provided which is effectively vacuum resistant.

In an embodiment of the method according to the invention, supporting pieces are preferably inserted in the inner space limited by the panels of the building element, to connect the largest panels of the element. In this way, the structure of the element can be stiffened and reinforced to enhance its resistance to the vacuum in the space inside the element. These supporting pieces are preferably rod-shaped pieces or boards provided with openings. Preferably, the supporting pieces are also made of wood material.

In an embodiment of the method according to the invention, the wooden panels of the building element are preferably plywood boards, and the supporting pieces of the building element are also preferably made of plywood or laminated veneer lumber (LVL).

In an embodiment of the method according to the invention, glass and/or rubber sheets are preferably attached to the outer surfaces of the wooden panels of the building element, to make these panels substantially airtight. Metal sheets, such as aluminium sheets, may be used as well. Preferably, the sheets are fastened onto the wooden panels of the element by applying an elastic fixing layer, such as a Liquid Rubber HSB200 material layer.

In an embodiment of the building element according to the invention, the thickness of the element is preferably 10 to 150 cm (3.937 in to 59.055 in), more preferably 15 (5.9055 in) to 30 cm (11.811 in), and the width of the element is preferably 120 (47.244 in) to 320 cm (125.984 in).

The building element with a wooden frame according to the invention comprises a wooden frame and insulation material placed inside the frame, the wooden panels defining the outer surfaces of the frame of the building element are coated to be air tight, the space inside the frame is filled with expanded perlite, and a vacuum pump is connected to the element for applying a vacuum in the space inside the frame.

In an embodiment of the building element according to the invention, the vacuum pump connected to the element is preferably used for adjusting the vacuum in the space inside the frame of the building element. This adjustment of the vacuum in the inside space enables dynamic adjustment of the thermal insulation properties of the building element.

In an embodiment of the building element according to the invention, the edges of the panels of the element are preferably provided with bevels, at which the panels are joined together with a glued joint. The wooden panels are preferably plywood boards.

In an embodiment of the building element according to the invention, the space inside the frame is preferably equipped with supporting pieces connecting the largest outer panels of the element, the supporting pieces being preferably rod-like pieces and/or boards provided with openings. Preferably, the supporting pieces are also made of wooden material, such as plywood or laminated veneer lumber for example.

In an embodiment of the building element according to the invention, glass and/or rubber sheets are attached to the outer surfaces of the wooden panels of the building element, to achieve substantial air tightness. Metal sheets, such as aluminium sheets, may be used here as well. Preferably, the sheets are fastened by applying an elastic fixing layer, such as a Liquid Rubber HSB200 material layer.

In an embodiment of the building element according to the invention, the building element advantageously comprises a filter at the connection of the vacuum pump, to prevent removal of insulation material from the inside of the element.

In an embodiment of the building element according to the invention, the thickness of the element is preferably 10 to 150 cm, more preferably 15 to 30 cm, and the width of the element is preferably 120 to 320 cm.

The invention also provides a building element system comprising a plurality of building elements according to the invention, all the building elements being connected to one and the same vacuum pump. In this way, a vacuum is applied in all the building elements of the system by a single vacuum pump, and the thermal insulation properties of the whole system can be adjusted by the same pump. If the vacuum pump is placed inside the building to be insulated, the pump will act as a heat source as well, because the energy used by the pump will be primarily converted to heat.

Features of the method, of the building element and of the building element system are presented in more details in the claims.

BRIEF DESCRIPTION OF THE DRAWINGS

In the following, the invention will be described in more detail by way of example with reference to the appended figures, in which.

DETAILED DESCRIPTION OF EMBODIMENTS OF THE INVENTION

Figure 1:
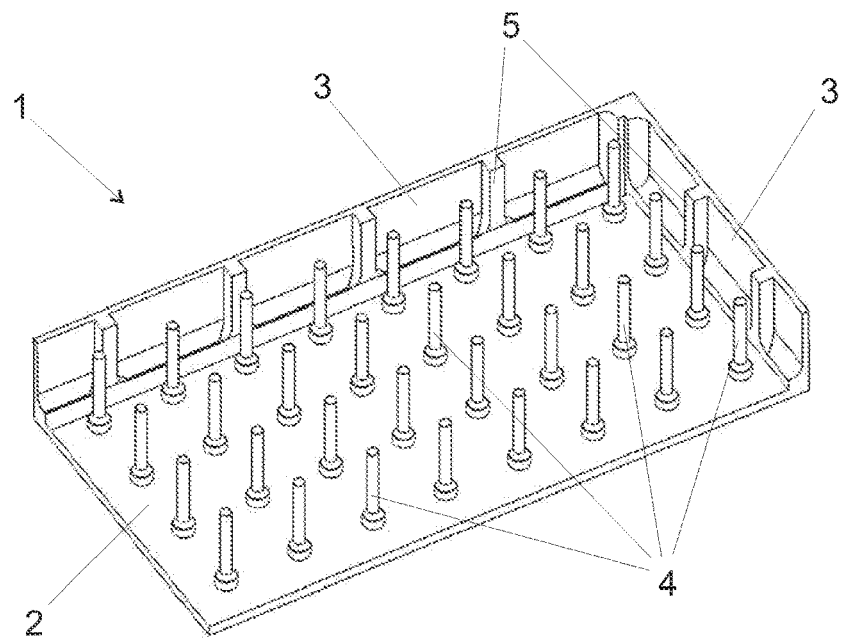
FIG. 1 shows schematically a structure of a part of a building element according to the invention.

FIG. 1 schematically shows a part of the structure of a building element 1 according to the invention.

In the embodiment of FIG. 1, the structure of the building element 1 consists of panels and bottom plates 2, flank panels 3 of the element, and supporting bars 4. In the embodiment of FIG. 1, the flank panels 3 are also provided with reinforcements 5.

FIGS. 2A to 2D schematically show an embodiment for the edge joint between the panels 2 and the flank panels 3 of the building element according to the invention, and variants of the edge joint.

In this embodiment, a bevel of 45 degrees is worked on all edges of the panels 2 and the flank panels 3. At these bevels, the panels 2 and the flank panels 3 are joined together by glued joints 6.

These bevels are used to minimize elongation of the glued joints 6 between the flank panels 3 and the panels 2 of the element, which are preferably plywood sheets, due to dimensional changes caused by vacuum drying of the plywood sheets. This is based solely on the naturally orthotropic material properties of wood; that is, the dimensions of wood, and thereby also plywood, are changed by changes in the moisture content, in different ways depending on the direction of viewing the material. With these bevels of 45 degrees, the effects of the moisture content on the glued joint 6 can be minimized.

Figure 2A:
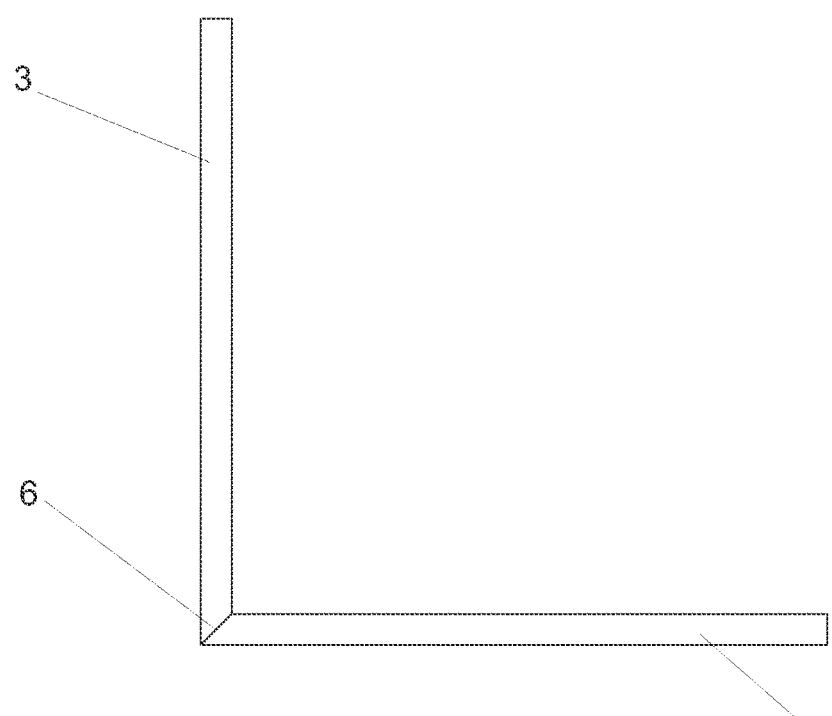
FIGS. 2A to 2D show schematically some edge joints of panels of a building element according to the invention.
Figure 2B:
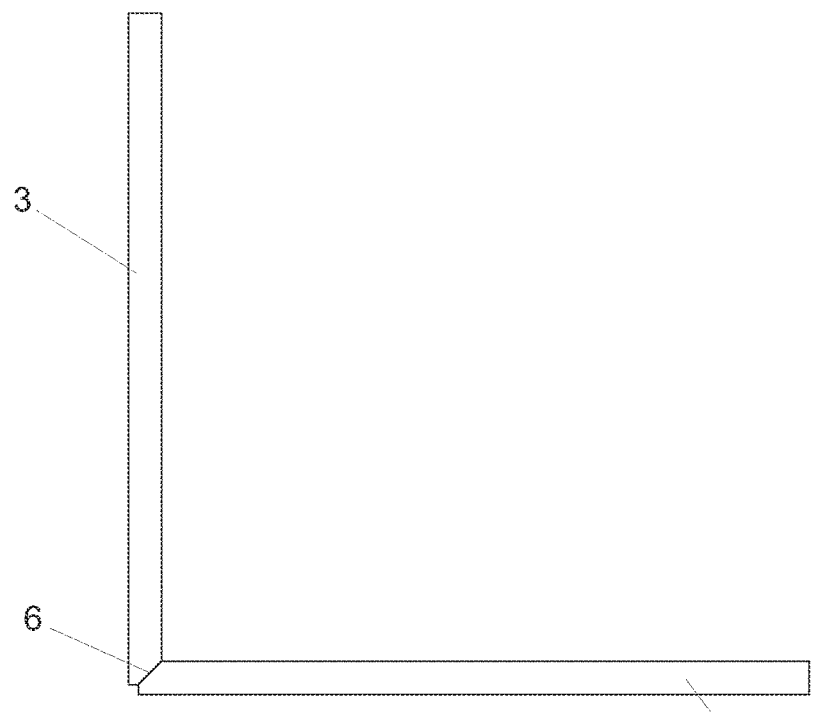
Figure 2C:
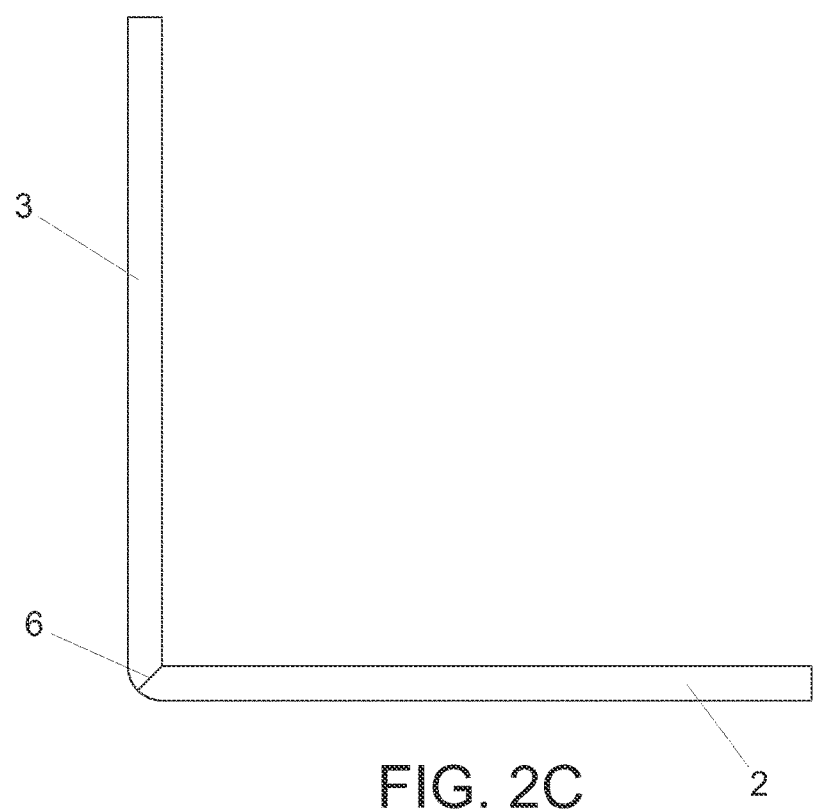
Figure 2D:
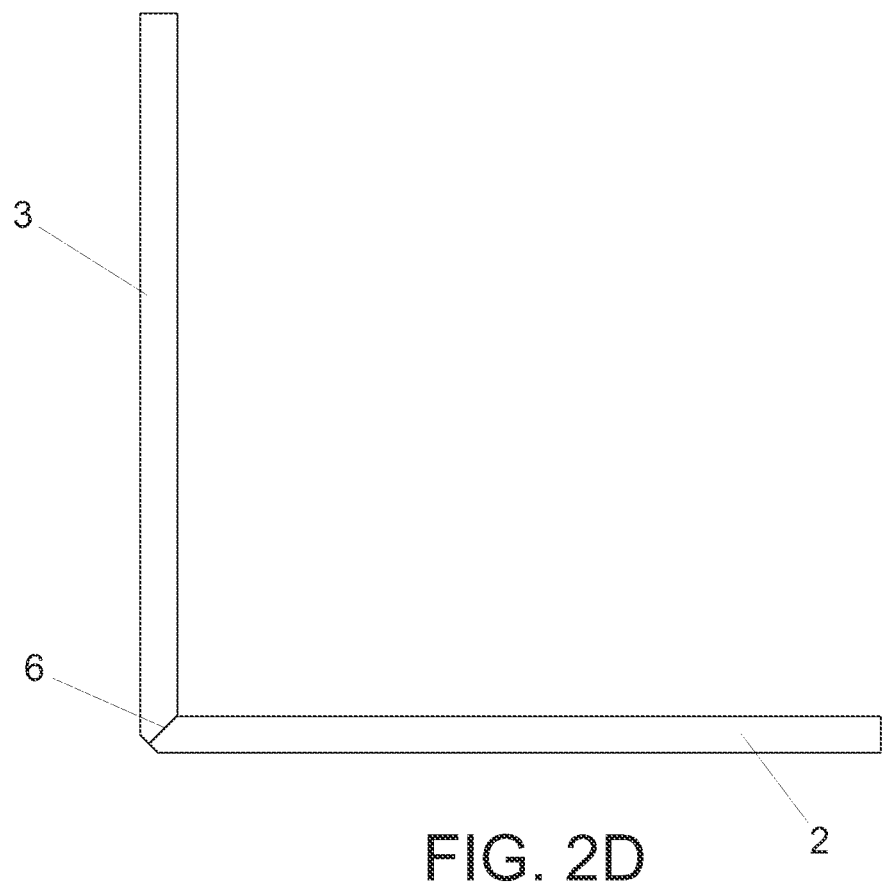

In the example of FIG. 2A, the bevel extends over the whole thickness of the sheets 2 and 3 to be joined, whereas the example of FIG. 2B shows a joint with incomplete bevels. In the example of FIG. 2C, the outer edge of the joint is worked to be rounded, and in the example of FIG. 2D, the outer edge of the joint is worked to have a bevel whose plane is substantially perpendicular to the glued joint 6. The edge shapes shown in FIGS. 2C and 2D facilitate the coating of the outer surface of the element to become airtight.

Figure 3A:
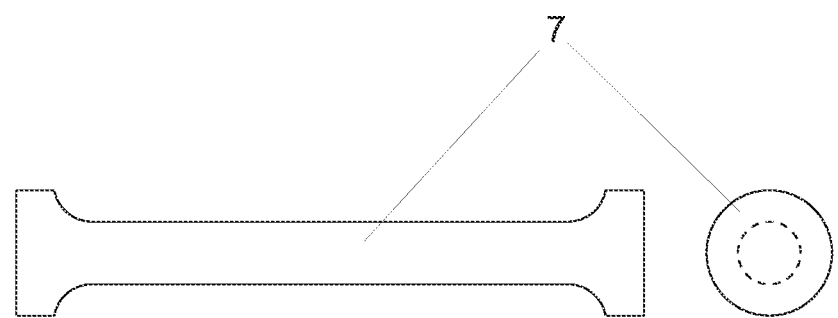
FIGS. 3A and 3B show schematically some supporting pieces for the space inside a building element according to the invention.
Figure 3B:
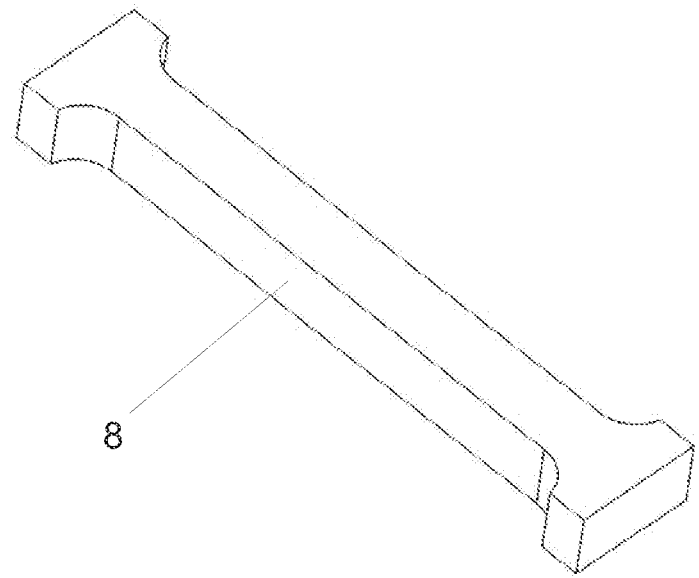

FIGS. 3A and 3B schematically show some reinforcing pieces 7 and 8 for the space inside the building element according to the invention.

The reinforcing pieces 7 and 8 are designed to have a rod-like shape with sections widening at the ends. Being an orthotropic material, wood withstands loads in different ways, depending on the direction of the load. To conduct as little heat as possible through the building element, and not to be cut under the pressure loading through the panels of the element, the supporting elements 7 and 8 have to be shaped wider at their ends than in their middle sections.

In the embodiment of FIG. 3A, the supporting piece 7, which is shown in both side and end projections in FIG. 3A, is made by lathing, and the material used is plywood or laminated veneer lumber.

In the embodiment of FIG. 3B, the supporting piece 8 is designed to have an angular shape and is made of a plywood board or a plywood beam by sawing, milling or laser cutting.

Figure 4A:
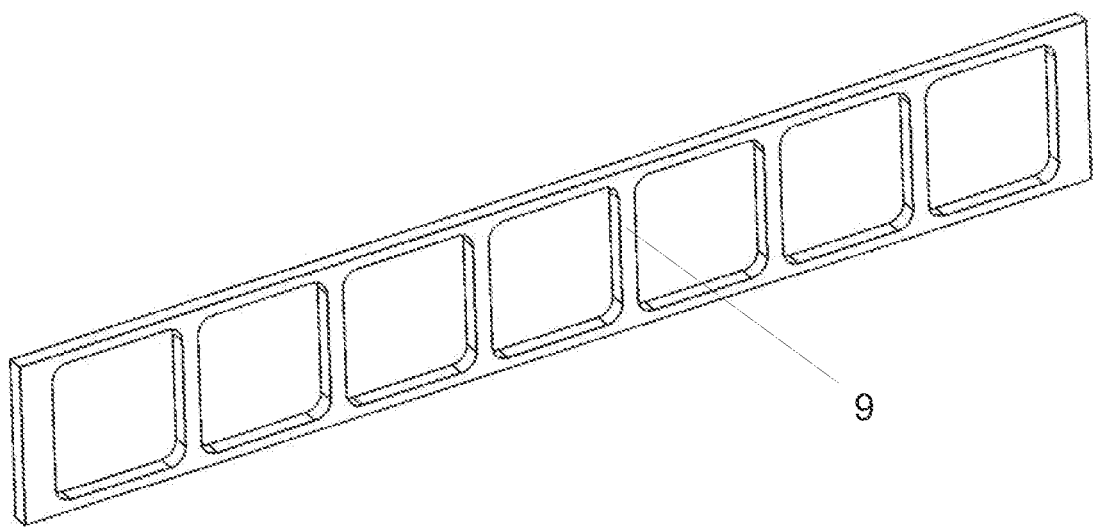
FIGS. 4A to 4C show schematically a plate-like reinforcement for a building element according to the invention, separately and attached to a panel, as well as an alternative embodiment for the reinforcement.
Figure 4B:
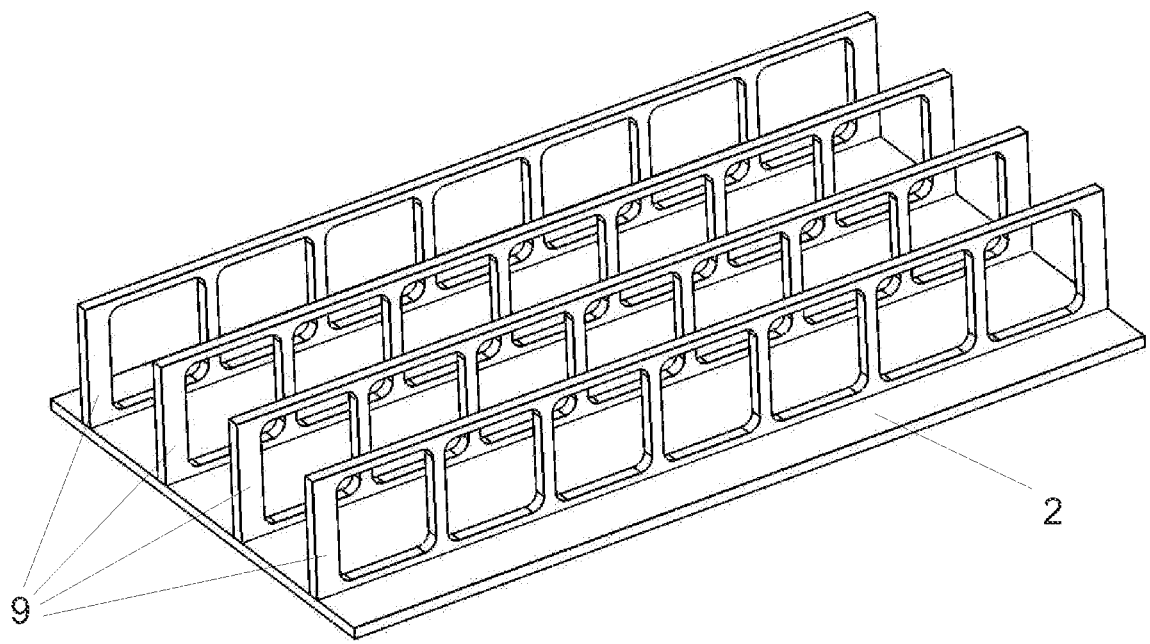
Figure 4C:
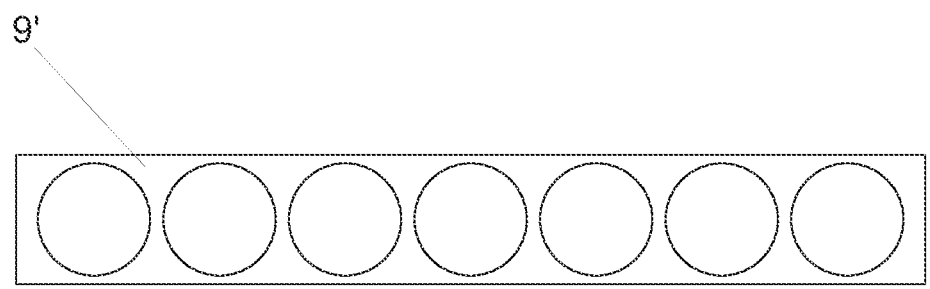

FIGS. 4A and 4B schematically show a plate-like reinforcement 9 for a building element according to the invention, separately and connected to a panel 2, and FIG. 4C schematically shows an alternative embodiment 9' of a plate-like reinforcement for a building element according to the invention.

In the embodiment of FIGS. 4A and 4B, the plate-like reinforcement 9 corresponds, in practice, to a uniform row of angular supporting pieces of FIG. 3B, connected to each other at their ends. This embodiment provides an alternative for separate single supporting pieces. Such a plate-like structure facilitates the manufacture of the supporting structure of the building element according to the invention, and its attachment to the panels 2 of the element. In this embodiment, a compromise is sought between the manufacturing costs and the thermal insulation capacity. The plate-like reinforcement 9 is preferably made of a plywood board by milling.

FIG. 4B illustrates an implementation of the internal supporting structure of the building element according to the invention, with plate-like reinforcements 9.

In the embodiment of the plate-like reinforcement of FIG. 4C, the openings in the plate-like reinforcement 9' are formed by drilling, wherein cost-efficiency is achieved in the formation of the openings.

FIGS. 5A to 5D schematically show some embodiments of reinforcements for flank panels 3 of a building element 1 according to the invention.

In the building element according to the invention, the shaping of the flanks can be enhanced by optimizing the design of the flank of the element. Thus, the flank structure of the element is made by gluing a rectangular plywood sheet (flank panel 3) made of thin veneers and having an even thickness to a flank reinforcement structure made of plywood and worked to shape (FIG. 1, reinforcements 5). In this way, a lower thermal transmittance coefficient is obtained for the element than for an element having flank structures with a completely uniform thickness.

Figure 5A:
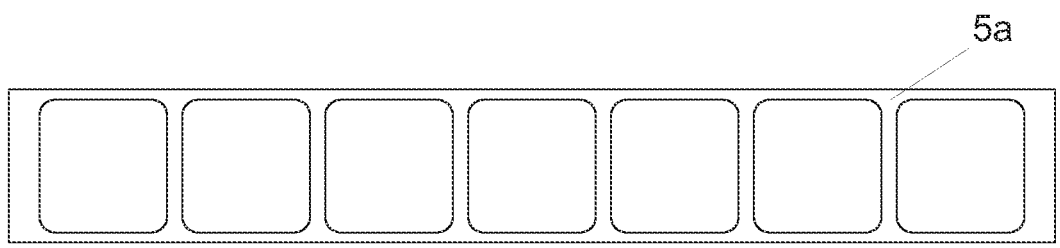
FIGS. 5A to 5D show schematically some embodiments of reinforcements for flank panels of a building element according to the invention.

In the embodiment of FIG. 5A, the reinforcement structure 5a of the flank panel is formed of perpendicular reinforcements. In this reinforcement structure 5a, the reinforcements are perpendicular to the longitudinal direction of the flank panel, and the reinforcement structure is made of a plywood sheet by milling.

Figure 5B:
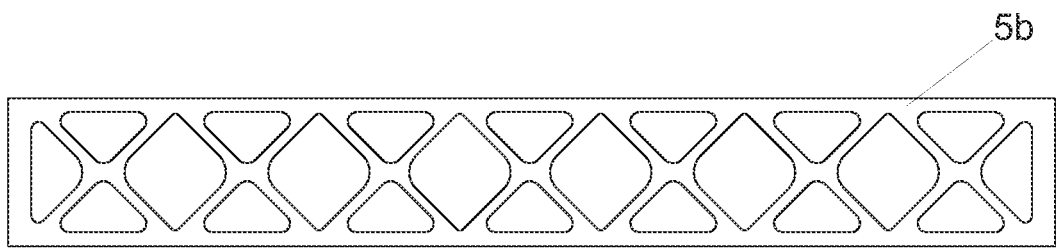

In the embodiment of FIG. 5B, the reinforcement structure 5b of the flank panel is formed of reinforcements forming a grid-like structure. In this reinforcement structure 5b, the reinforcements are oblique with respect to the longitudinal direction of the flank, forming a grid structure, and the reinforcement structure is made of a plywood sheet by milling.

Figure 5C:
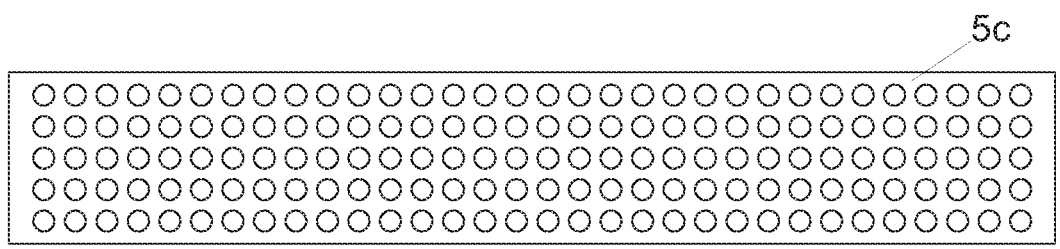

In the embodiment of FIG. 5C, the reinforcement structure 5c of the flank has the geometry of a perforated structure which can be made by drilling instead of milling. Thus, the U value of the element is not fully optimized, but the manufacturing costs of the element can be reduced.

Figure 5D:
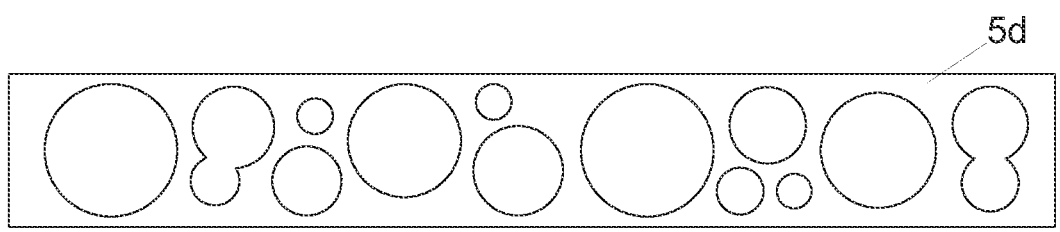

In the embodiment of FIG. 5D, the reinforcement structure 5d of the flank is provided with openings in different sizes and locations, wherein the size and the location of the openings are used to improve the U value of the element in a cost-efficient way with respect to a flank structure with a uniform thickness.

Figure 6:
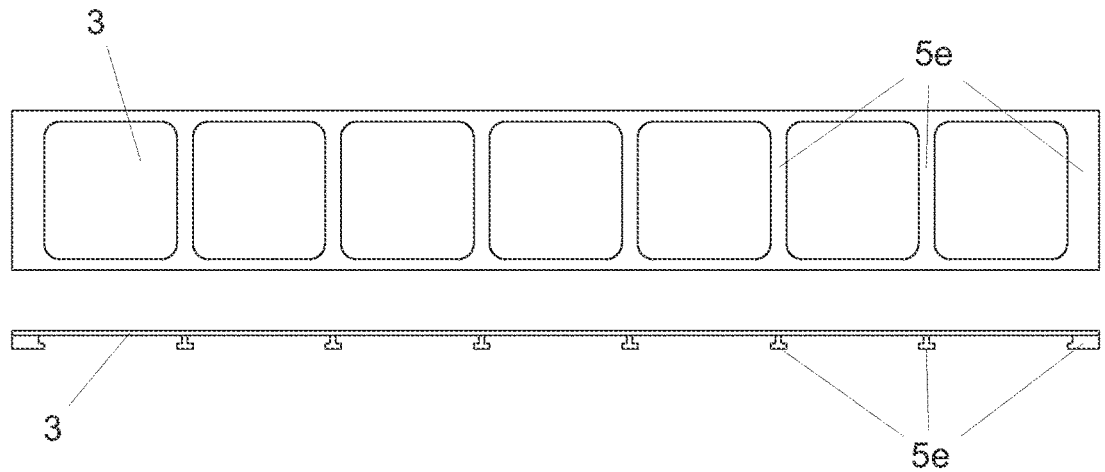
FIG. 6 shows schematically an alternative embodiment of reinforcements for flank panels, in two different projections.

FIG. 6 shows a further developed embodiment of a reinforcement structure for flank panels, both in a lateral projection and in a cross-sectional view. The figure shows a flank panel 3 glued onto a reinforcement structure 5e.

In the building element according to the invention, the reinforcement structure of the flank can be optimized further in view of a better thermal transmittance coefficient of the element, by providing the reinforcements of the reinforcement structure with T-shaped shoulders by milling. This is illustrated in FIG. 6 for the case of transverse reinforcements according to FIG. 5A.

The inner corners of the T-shaped shoulders may also be rounded. The solution may be applied to perpendicular reinforcements (FIG. 5A), reinforcements having a grid structure (FIG. 5B) as well as reinforcements having a perforated structure (FIGS. 5C and 5D). In perforated structures, the openings have to be worked by milling. T-shaped reinforcements increase the bending stiffness of the reinforcement structure compared with a reinforcement structure having the same cross-sectional area without shoulders. Thus, the flank structure of the element can be made in the form of a structure having a lighter weight, and less heat will be conducted along the flank structure through the element.

Figure 7:
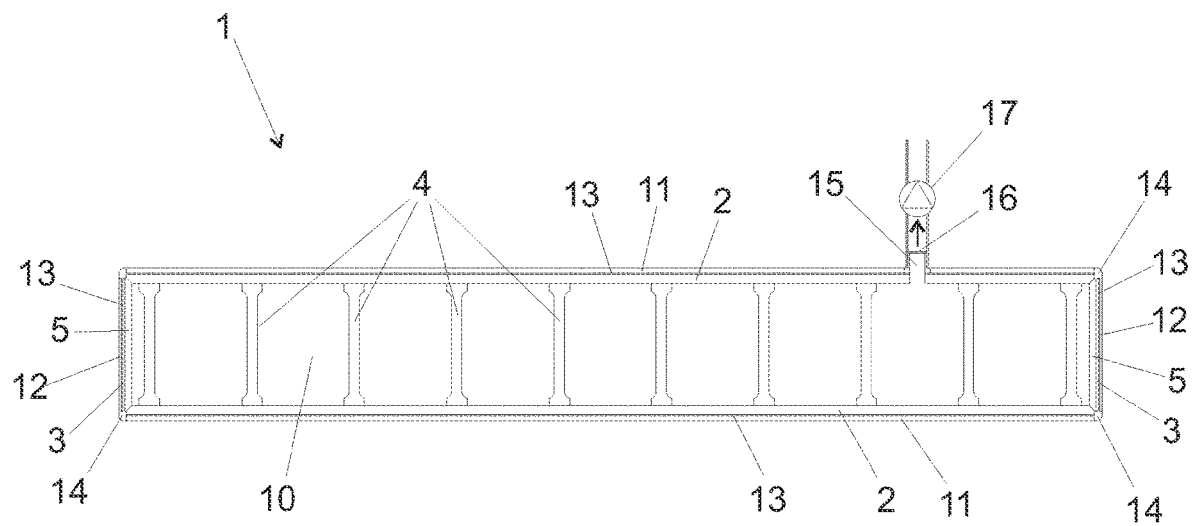
FIG. 7 shows schematically a cross-sectional view of a building element according to the invention.

FIG. 7 schematically shows the cross-section of a building element 1 according to the invention.

In this embodiment, the building element 1 consists of panels 2, flank panels 3, supporting rods 4 for the inner space of the element, a reinforcement structure 5 for the flank panels, expanded perlite 10 used as insulation material, a glass coating 11 on the panels, a rubber sheet coating 12 on the flanks, an elastic fastening layer 13 on the panels, a sealing seam 14 at the edges of the coating sheets, a connection to a vacuum pump 15, a filter 16, and a vacuum pump 17.

In this embodiment, the air-tight coating of the panels 2 of the building element 1 is implemented as a glass coating 11 by using window glass panes, and the air-tight coating of the flank panels 3 is implemented as a rubber sheet coating 12 by using EPDM rubber sheets, the sheets being fastened with an elastic fixing layer 13 by using Liquid Rubber HBS200 material. Metal sheets, such as aluminium sheets, may also be used as the air-tight coating.

The connection 15 for the vacuum pump 17 is provided with a filter 16 to prevent removal of expanded perlite 10 from the space inside the element. A metal filter gauze with a micro mesh size is used as the filter 15.

The parts of the frame of the building element 1 are joined together by gluing with a polyurethane glue.

The thickness of the building element 1 may vary between 10 cm and 150 cm (3.937 in and 59.055 in). In most uses, the thickness of the element varies between 15 cm (5.9055 in) and 30 cm (11.811 in), but in applications where a minimum U value is sought, the element may have a thickness even greater than one meter. The width of the element may vary between 120 cm (47.244 in) and 320 cm (125.984 in). In most uses, the width of the element will be between 280 cm (110.236 in) and 320 cm (125.984 in). The length of the element may vary between 120 cm (47.244 in) and 1500 cm (590.551 in). In most uses, the length of the element will be between 600 cm (236.22 in) and 1500 cm (590.551 in). In an element longer than 300 cm (181.11 in) or wider than 150 cm (59.0551 in), scarfed plywood is used as the material for the panels and the flank panels.

EXAMPLES

In a first example, an element having a size of 120 cm (47.244 in)×120 cm (47.244 in)×23.6 cm 9.291339 is examined at an average temperature of 10 C (50 F), i.e. about 283 K. The density of expanded perlite is 60 kg/m3 (0.00216764 lb/in3), and the average pore size of a layer is assumed to be 100 micrometres (0.00393701 in). Further, a pressure of about 0.1 millibar is maintained in the element. Under these conditions, the thermal conductivity of air is estimated to be about 0.0025 W/(m·K). The thermal conductivity transmitted by the solid substance of the perlite layer and thermal radiation is estimated to have a value of about 0.006 W/(m·K). Consequently, the total value determined for the thermal conductivity of the perlite layer will thus be 0.0085 W/(m·K).

The panels of the element examined consist of birch plywood having a thickness of 18 mm (0.708661 in), and they are placed 20 cm (7.87402 in) apart from each other. At the flanks of the frame structure, reinforcements 5a according to FIG. 5A are used, as well as 49 supporting rods 7 made of glued laminated wood and shown in FIG. 3A. All the veneers of the glued laminated wood are aligned, to achieve the best compression strength. The optimized radius of the tapered middle section of the supporting rod is thus 10 mm (0.3937 in), and the radius of the widened ends, in turn, 20 mm (0.787 in). One flank of the element comprises six reinforcements transverse to the longitudinal direction of the flank. These reinforcements have a width of 15 mm (0.590551 in) and a thickness of 21 mm (0.826772 in). The distance between the reinforcements is 135 mm (5.31496 in), and the thickness of the thin veneer plywood glued onto the reinforcement structure of the flank is 6.5 mm (0.255906 in).

The thermal conductivity of glued laminated wood in the direction of the veneer is found to be 0.22 W/(m·K), and the thermal conductivity of birch plywood, in the direction of the veneer, is estimated to be 0.17 W/(m·K). Thus, the proportion of the transmittance coefficient of heat transmitted along the frame, obtained with the above presented geometry, is about 0.040 W/(m²·K). The proportion of the perlite layer, in turn, can be determined to be 0.041 W/(m²·K). Finally, by summing up the proportions of the perlite layer and the frame structure on the thermal transmittance coefficient, a U value of 0.081 W/(m²·K) is obtained for the element.

Examining a larger size of the element, the relative proportion of heat transferred along the flanks of the elements of the thermal transmittance coefficient of the element decreases; the ratio between the cross-sectional area of the flanks and the total cross-sectional area of the element decreases. In another example, the size of the element is 3 m×1.5 m×23.6 cm. Thus, the proportion of heat transferred along the frame of the element of the thermal transmittance coefficient of the element decreases to the value 0.027 W/(m²·K), and a calculated U value as low as 0.068 W/(m²·K) would be achieved for the element. From this, the thermal transmittance coefficient can be decreased even further by making the element thicker, by optimizing the geometry of the frame in the direction of FIGS. 5A and 6, and by developing a barrier layer with a higher density, whereby an ever lower internal pressure can be achieved in the element.

In a third example, a case according to the first example is examined, but with the exception of maintaining the internal pressure of the element at about 3 millibar. Thus, the total thermal conductivity of the perlite layer can be estimated to have an approximate value of 0.020 W/(m·K). Thus, a value of 0.10 W/(m²·K) can be calculated for the proportion of the perlite layer of the thermal transmittance coefficient of the element, and the U value calculated for the element will be 0.14 W/(m²·K). Under these conditions, measurements of the thermal transmittance coefficient of a test specimen of an element were taken by Hot-Box equipment of Eurofins Expert Service (previously VTT Expert Service) in September 2018. The measured U value was 0.28 W/(m²·K). The difference between the theoretical and measured U values is probably due to a too large granular size of expanded perlite.

With respect to the embodiments of the invention shown in the figures and described above, it should be noted that they are not intended to limit the invention in any way. A person skilled in the art will know how to and can amend these embodiments in a number of obvious ways within the scope of the appended claims. Consequently, the invention is not limited to the above described embodiments only.

The invention claimed is:

1. A building element, comprising:
a box-shaped wooden frame comprised entirely of wooden panels with supporting pieces located inside the frame delimited by the wooden panels, wherein a largest of the wooden panels are flank panels, the supporting pieces configured to connect the flank panels of the building element, and insulation material inserted in the frame, wherein the wooden panels defining outer surfaces of the frame of the building element are coated to be air-tight such that a hermetic seal is provided thereto, an inner space in the wooden frame is filled with expanded perlite, and a vacuum pump is permanently connected to the building element, the vacuum pump being configured for (a) applying a vacuum in the inner space inside the frame, (b) enabling vacuum drying of the building element, and (c) altering thermal insulation properties of the building element.

2. The building element according to claim 1, wherein the vacuum pump permanently connected to the building element is used for adjusting the vacuum in the space inside the frame of the building element.

3. The building element according to claim 1, wherein edges of the wooden panels of the building element are provided with bevels, at which the wooden panels are joined together by a glued joint, and wherein the wooden panels are plywood sheets.

4. The building element according to claim 1, wherein the supporting pieces are rod-shaped or sheets provided with openings and being made of a wooden material.

5. The building element according to claim 1, wherein at least one of glass panes, rubber sheets, or metal sheets are attached onto the outer surfaces of the wooden panels of the building element, to achieve substantial air tightness, the attachment being implemented with an elastic fixing layer.

6. The building element according to claim 1, the building element being provided with a filter in connection with the connection of the vacuum pump, to prevent removal of the insulation material from inside of the building element.

7. The building element according to claim 1, wherein a thickness of the building element is 10 to 150 cm, a width of the building element is 120 to 320 cm, and a length of the building element is 120 to 1500 cm.

8. The building element according to claim 7, wherein the thickness of the building element is 15 to 30 cm.

9. A building element system comprising a plurality of the building elements according to claim 1, each of the building elements of the plurality of building elements being permanently connected to the same vacuum pump.

* * * * *